(12) United States Patent
Gu et al.

(10) Patent No.: US 10,862,233 B2
(45) Date of Patent: Dec. 8, 2020

(54) POWER INTERFACE, MOBILE TERMINAL, AND POWER ADAPTER

(71) Applicant: GUANGDONG OPPO MOBILE TELECOMMUNICATIONS CORP., LTD., Guangdong (CN)

(72) Inventors: Guodong Gu, Dongguan (CN); Feifei Li, Dongguan (CN)

(73) Assignee: Guangdong OPPO Mobile Telecommunications Corp., Ltd., Guangdong (CN)

( * ) Notice: Subject to any disclaimer, the term of this patent is extended or adjusted under 35 U.S.C. 154(b) by 81 days.

(21) Appl. No.: 16/314,745

(22) PCT Filed: Apr. 19, 2017

(86) PCT No.: PCT/CN2017/081020
§ 371 (c)(1),
(2) Date: Jan. 2, 2019

(87) PCT Pub. No.: WO2018/018947
PCT Pub. Date: Feb. 1, 2018

(65) Prior Publication Data
US 2019/0157781 A1 May 23, 2019

(30) Foreign Application Priority Data

Jul. 27, 2016 (CN) .......................... 2016 1 0605837
Jul. 27, 2016 (CN) ..................... 2016 2 0808011 U

(51) Int. Cl.
*H02J 7/00* (2006.01)
*H01R 12/58* (2011.01)
(Continued)

(52) U.S. Cl.
CPC ............. *H01R 12/58* (2013.01); *H01R 12/52* (2013.01); *H01R 12/7088* (2013.01);
(Continued)

(58) Field of Classification Search
CPC ....... Y02E 60/12; H02J 7/0044; H02J 7/0042; H02J 7/0045; H01M 2/1022
See application file for complete search history.

(56) References Cited

U.S. PATENT DOCUMENTS 4,790,760 A * 12/1988 Kreinberg ............ H05K 7/1457
439/55
8,305,741 B2 * 11/2012 Chatterjee ............. G06F 1/1632
361/679.02
(Continued)

FOREIGN PATENT DOCUMENTS

CN 203166148 U 8/2013
CN 203553401 U 4/2014
(Continued)

OTHER PUBLICATIONS

International Search Report in international application No. PCT/CN2017/081020, dated Jul. 20, 2017.
(Continued)

*Primary Examiner* — Arun C Williams

(57) ABSTRACT

A power interface (100), a mobile terminal and a power adapter are provided. The power interface (100) includes a body portion (110), data pins (120) and power pins (130). The body portion (110) is configured to be coupled to a circuit board, and there are multiple spaced data pins (120) connected with the body portion (110). There may be multiple spaced power pins (130) connected with the body portion (110). The power pins (130) and the data pins (120) are arranged at intervals. At least one of the multiple power pins (120) includes a widened section (132), and a cross-sectional area of the widened section (132) is greater than a cross-sectional area of each of the data pins (120) to increase a current load capacity of the power pin (130).

20 Claims, 5 Drawing Sheets

(51) Int. Cl.
- *H01R 24/60* (2011.01)
- *H01R 12/70* (2011.01)
- *H01R 13/28* (2006.01)
- *H01R 12/52* (2011.01)
- *H01R 107/00* (2006.01)

(52) U.S. Cl.
CPC ............. *H01R 13/28* (2013.01); *H01R 24/60* (2013.01); *H02J 7/007* (2013.01); *H02J 7/0045* (2013.01); *H01R 2107/00* (2013.01)

(56) References Cited

U.S. PATENT DOCUMENTS

| | | | | |
|---|---|---|---|---|
| 2003/0052547 | A1* | 3/2003 | Fischer | H02J 7/0027 307/154 |
| 2004/0115980 | A1* | 6/2004 | Douty | H01R 13/44 439/284 |
| 2004/0268160 | A1* | 12/2004 | Atkinson | H01R 31/06 713/300 |
| 2006/0154530 | A1* | 7/2006 | Novotney | H01R 24/62 439/660 |
| 2007/0273327 | A1* | 11/2007 | Daniel | H01M 2/105 320/110 |
| 2008/0165982 | A1* | 7/2008 | Hankey | B29C 48/09 381/74 |
| 2008/0261448 | A1* | 10/2008 | Yi | H01R 24/62 439/607.01 |
| 2009/0111320 | A1* | 4/2009 | Johansson | H01R 13/24 439/466 |
| 2010/0013431 | A1* | 1/2010 | Liu | H02J 50/70 320/108 |
| 2010/0068939 | A1* | 3/2010 | Xu | H01R 24/60 439/651 |
| 2010/0304581 | A1* | 12/2010 | Davis | H01R 12/727 439/65 |
| 2011/0181238 | A1* | 7/2011 | Soar | B60N 2/24 320/108 |
| 2013/0115821 | A1* | 5/2013 | Golko | H04L 12/40013 439/638 |
| 2013/0117470 | A1* | 5/2013 | Terlizzi | H01R 13/665 710/3 |
| 2013/0244491 | A1* | 9/2013 | Sarwar | G06F 13/4068 439/655 |
| 2014/0206209 | A1* | 7/2014 | Kamei | H01R 12/81 439/81 |
| 2014/0302782 | A1* | 10/2014 | Raab | H02J 50/12 455/41.1 |
| 2015/0004845 | A1* | 1/2015 | Barrefelt | H01R 13/504 439/626 |
| 2015/0011104 | A1* | 1/2015 | Lee | H01R 13/6471 439/108 |
| 2016/0004287 | A1* | 1/2016 | Qiu | H01R 24/62 713/300 |
| 2016/0087377 | A1* | 3/2016 | Toba | H01R 13/6594 439/620.22 |
| 2016/0372876 | A1 | 12/2016 | Zhang et al. | |
| 2016/0380372 | A1* | 12/2016 | Hsieh | H01R 13/2442 439/676 |
| 2017/0201052 | A1 | 7/2017 | Peng et al. | |
| 2017/0264057 | A1* | 9/2017 | Baum | H02J 7/0042 |
| 2017/0331236 | A1 | 11/2017 | Zhang et al. | |
| 2018/0069357 | A1 | 3/2018 | Zhang et al. | |
| 2018/0302116 | A1* | 10/2018 | Nitti | H04M 1/0262 |

FOREIGN PATENT DOCUMENTS

| | | |
|---|---|---|
| CN | 104009352 A | 8/2014 |
| CN | 204289773 U | 4/2015 |
| CN | 204538336 U | 8/2015 |
| CN | 105006668 A | 10/2015 |
| CN | 204905502 U | 12/2015 |
| CN | 204966736 U | 1/2016 |
| CN | 205282692 U | 6/2016 |
| CN | 106025616 A | 10/2016 |
| CN | 205863454 U | 1/2017 |
| CN | 205882209 U | 1/2017 |
| JP | 59152676 U | 10/1984 |
| JP | H10294024 A | 11/1998 |
| JP | 2000003739 A | 1/2000 |
| JP | 2008066033 A | 3/2008 |
| JP | 2014049411 A | 3/2014 |
| JP | 2015022874 A | 2/2015 |
| WO | 2015113340 A1 | 8/2015 |

OTHER PUBLICATIONS

Written Opinion of the International Search Authority in international application No. PCT/CN2017/081020, dated Jul. 20, 2017.
First Office Action of the Japanese application No. 2019-504008, dated Mar. 24, 2020.
First Office Action of the Korean application No. 10-2019-7004573, dated Apr. 17, 2020.
First Office Action of the European application No. 17833253.2, dated May 18, 2020.
Office Action of the Indian application No. 201917007100, dated Mar. 6, 2020.
First Office Action of the Chinese application No. 201610605837.8, dated Jul. 13, 2017.
Second Office Action of the Chinese application No. 201610605837.8, dated Oct. 25, 2017.
Notice of Rejection of the Chinese application No. 201610605837.8, dated Jan. 23, 2018.
Decision of re-examination of the Chinese application No. 201610605837.8, dated May 20, 2019.
Supplementary European Search Report in the European application No. 17833253.2, dated May 31, 2019.
English translation of the Written Opinion of the International Search Authority in the international application No. PCT/CN2017/081020, dated Jul. 20, 2017.
Second Office Action of the Japanese application No. 2019-504008, dated Aug. 18, 2020.

* cited by examiner

POWER INTERFACE, MOBILE TERMINAL, AND POWER ADAPTER

TECHNICAL FIELD

The present disclosure relates to the technical field of communications, and particularly, to a power interface, a mobile terminal and a power adapter.

BACKGROUND

With the progress of the times, the Internet and mobile communication networks have provided massive function applications. A user may use a mobile terminal for a conventional application, for example, using a smart phone to answer the phone or make calls. Meanwhile, the user may also use a mobile terminal for web browsing, picture transmission, gaming and the like.

When a mobile terminal is adopted to handle things, since a using frequency of the mobile terminal increases, power of a battery cell may be greatly consumed and frequent charging is required. Due to acceleration of the pace of life, particularly increasing emergencies, a user also expects to charge a battery cell of a mobile terminal with a high current.

SUMMARY

The present disclosure is intended to solve one of the technical problems in the related art at least to a certain extent. To this end, the present disclosure discloses a power interface. The power interface has the advantages of reliable connection and quick charging the battery.

The present disclosure also discloses a mobile terminal, which includes the abovementioned power interface.

The present disclosure also discloses a power adapter, which includes the abovementioned power interface.

The power interface according to an embodiment of the present disclosure includes: a body portion configured to be coupled to a circuit board; multiple spaced data pins, the data pins are connected with the body portion; and multiple spaced power pins, the power pins are connected with the body portion, the power pins are spaced from the data pins, at least one of the multiple power pins includes a widened section, and a cross-sectional area of the widened section is greater than a cross-sectional area of each of the data pins to increase a current load capacity of the power pin.

According to the power interface of the embodiments of the present disclosure, the widened portion is arranged on the power pin, and then the current load capacity of the power pin may be increased, so that a current transmission speed may be increased, the power interface is endowed with a quick charging function, and charging efficiency of a battery is improved.

The mobile terminal according to the embodiments of the present disclosure is provided with the abovementioned power interface.

According to the mobile terminal of the embodiments of the present disclosure, the widened portion is arranged on the power pin, and then the current load capacity of the power pin may be increased, so that the current transmission speed may be increased, the power interface is endowed with the quick charging function, and the charging efficiency of the battery is improved.

The power adapter according to the embodiments of the present disclosure is provided with the abovementioned power interface.

According to the power adapter of the embodiments of the present disclosure, the widened portion is arranged on the power pin, and then the current load capacity of the power pin may be increased, so that the current transmission speed may be increased, the power interface is endowed with the quick charging function, and the charging efficiency of the battery is improved.

Figure 1:
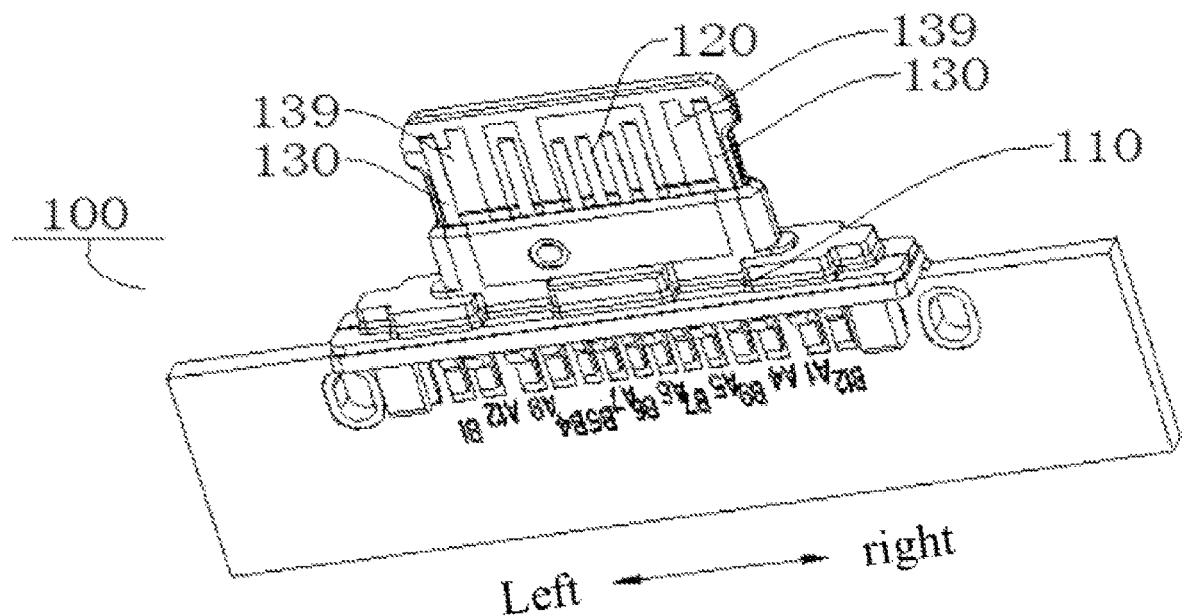
FIG. 1 is a partial structure diagram illustrating a power interface according to an embodiment of the present disclosure.

REFERENCE SIGNS IN THE DRAWINGS power interface 100,
body portion 110,
data pin 120,
power pin 130, front end 131, widened section 132, first sidewall 134, stepped surface 133, first stepped surface 133a, second sidewall 135, second stepped surface 133b, first wall surface 136, second wall surface 137, chamfer 138, insulating spacer layer 139,
rough portion 140 and middle patch 150.

DETAILED DESCRIPTION

The embodiments of the present disclosure will be described below in detail and examples of the embodiments are shown in the drawings. The embodiments described below with reference to the drawings are exemplary and intended to explain the present disclosure and should not be understood as limits to the present disclosure.

In the descriptions of the present disclosure, it is to be understood that orientation or position relationships indicated by terms "length", "width", "thickness", "upper", "lower", "front", "back", "left", "right", "bottom", "inner" "outer", "circumferential" and the like are orientation or position relationships shown in the drawings, are adopted not to indicate or imply that indicated devices or components must be in specific orientations or structured and operated in specific orientations but only to conveniently describe the present disclosure and simplify descriptions and thus should not be understood as limits to the present disclosure.

In addition, terms "first" and "second" are only adopted for description and should not be understood to indicate or imply relative importance or implicitly indicate the number of indicated technical features. Therefore, a feature defined by "first" and "second" may explicitly or implicitly indicate inclusion of at least one such feature. In the descriptions of the present disclosure, "multiple" means at least two, for example, two and three, unless otherwise limited definitely and specifically.

In the present disclosure, unless otherwise definitely specified and limited, terms "mount", "mutually connect", "connect", "fix" and the like should be broadly understood. For example, the terms may refer to fixed connection and may also refer to detachable connection or integration. The terms may refer to mechanical connection and may also refer to electrical connection or mutual communication. The terms may refer to direct mutual connection, may also refer to indirect connection through a medium and may refer to communication in two components or an interaction relationship of the two components, unless otherwise definitely limited. For those of ordinary skill in the art, specific meanings of these terms in the present disclosure can be understood according to a specific condition.

A power interface 100 according to embodiments of the present disclosure will be described below with reference to FIG. 1-FIG. 10 in detail. It is to be noted that the power interface 100 may be an interface configured for charging or data transmission and may be formed in a mobile phone, a tablet computer, a notebook computer or another rechargeable mobile terminal. The power interface 100 may be electrically connected with a corresponding power adapter to implement a communication connection of an electrical signal and a data signal.

As illustrated in FIG. 1-FIG. 10, the power interface 100 according to the embodiments of the present disclosure includes a body portion 110, data pins 120 and power pins 130.

Specifically, the body portion 110 is configured to be coupled to a circuit board and there are multiple spaced data pins 120 connected with the body portion 110. There may be multiple spaced power pins 130 connected with the body portion 110. The power pins 130 and the data pins 120 are arranged at intervals. At least one of the multiple power pins 130 includes a widened section 132, and a cross-sectional area of the widened section 132 is larger/greater than a cross-sectional area of each of the data pins 120 to increase a current load capacity of the power pin 130. It is to be noted that the power interface 100 may be formed/set in a mobile terminal, a battery may be arranged in the mobile terminal (for example, a mobile phone, a tablet computer and a notebook computer), and an external power supply may charge the battery through the power interface 100.

According to the power interface 100 of the embodiments of the present disclosure, the widened portion 132 is arranged on the power pin 130 and then the current load capacity of the power pin 130 may be increased, so that a current transmission speed may be increased, the power interface 100 is endowed with a quick charging function which means charging the battery quickly, and charging efficiency of the battery is improved.

According to an embodiment of the present disclosure, the cross-sectional area of the widened section 132 is recorded/represented as S, and (the value of) S is greater than or equal to 0.09805 mm², i.e., S≥0.09805 mm². Experiments show that, when S≥0.09805 mm², the current load capacity of the power pin 130 is at least 10 A, and thus the current load capacity of the power pin 130 may be increased to improve the charging efficiency. Further tests show that, when S is equal to 0.13125 mm², i.e., S=0.13125 mm², the current load capacity of the power pin 130 is 12 A or more, and thus the charging efficiency may be improved.

According to an embodiment of the present disclosure, a thickness of the power pin 130 is recorded as D, and D is greater than or equal to 0.1 mm and is less than or equal to 0.3 mm, i.e., 0.1 mm≤D≤0.3 mm. Experiments show that, when 0.1 mm≤D≤0.3 mm, the current load capacity of the power pin 130 is at least 10 A, and thus the current load capacity of the power pin 130 may be increased to improve the charging efficiency. Further tests show that, when D is equal to 0.25 mm, i.e., D=0.25 mm, the current load capacity of the power pin 130 may be greatly increased, the current load capacity of the power pin 130 is 12 A or more, and thus the charging efficiency may be improved.

Figure 2:
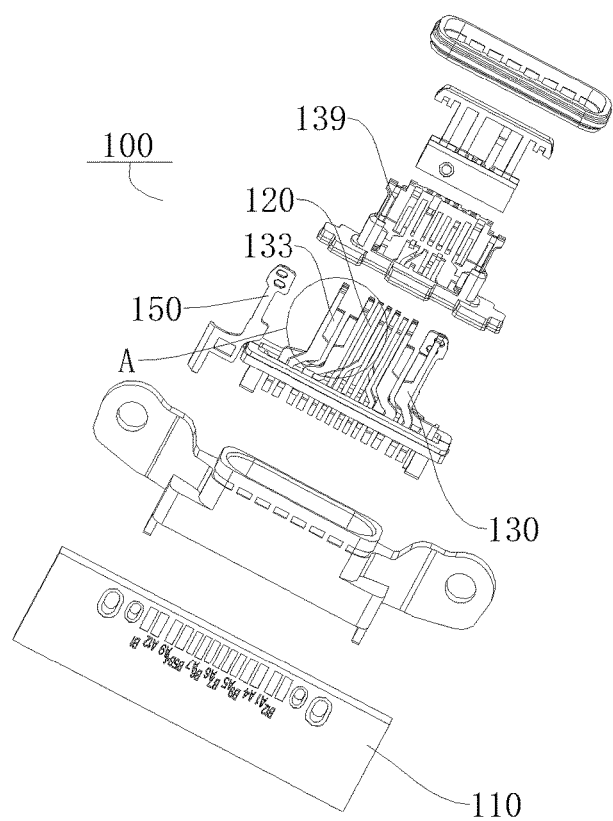
FIG. 2 is an exploded view illustrating a power interface according to an embodiment of the present disclosure.

According to an embodiment of the present disclosure, as illustrated in FIG. 2, the widened section 132 may be positioned in middle of the power pin 130. In such a manner, a layout of the multiple power pins 130 and the multiple data pins 120 may be optimized, and a space of the power interface 100 may be fully utilized, so that structural compactness and reasonability of the power interface 100 may be improved.

According to an embodiment of the present disclosure, a stepped surface 133 is arranged at a position, close to a front end 131 of the power pin 130, of the widened section 132, i.e., is arranged at the widened section 132 close to a front end 131 of the power pin 130. It is to be noted that, during quick charging of the power interface 100 in which the power interface 100 is configured to charge the battery quickly, the power pin 130 with the widened section 132 may be configured to bear a relatively high charging current and, during normal/ordinary charging of the power interface 100 in which the power interface 100 is configured to charge the battery normally/ordinarily, the stepped surface 133 on the widened section 132 may avoid the power pin 130 contacting with a corresponding pin on a power adapter. Therefore, the power interface 100 in the embodiments may be applied to/adapted to different power adapters. For example, during quick charging of the power interface 100, the power interface 100 may be electrically connected with a corresponding power adapter with a quick charging function; and during normal charging of the power interface 100, the power interface 100 may be electrically connected with a corresponding ordinary power adapter. It is to be noted herein that quick charging may refer to a charging state in which a charging current is more/greater than or equal to 2.5 A or a charging state in which rated output power is not lower/less than 15 W; and normal charging may refer to a charging state in which the charging current is lower than 2.5 A or a charging state in which the rated output power is lower than 15 W.

It is to be noted that the stepped surface 133 may be machined/made in a stamping manner, and one side of the stepped surface 133 may be formed into a sunken portion. For improving stability of the power interface 100 in use, the sunken portion may be filled with an insulating spacer layer 139. In such a manner, during normal charging of the power interface 100, the insulating spacer layer 139 may effectively space the power pin 130 from the corresponding pin on the power adapter and avoid charging interference of the widened section 132 to the pin on the power adapter, thereby improving adaptability of the power interface 100 to the ordinary charging power adapter and improving stability of the power interface 100 in a normal charging state. It is to be noted that the insulating spacer layer 139 may be formed into a rubber coating portion wrapping part of an outer surface of the power pin 130 and wrapping an outer surface of the data pin 120 and the rubber coating portion is made from/of a thermal conductive insulating material.

Figure 7:
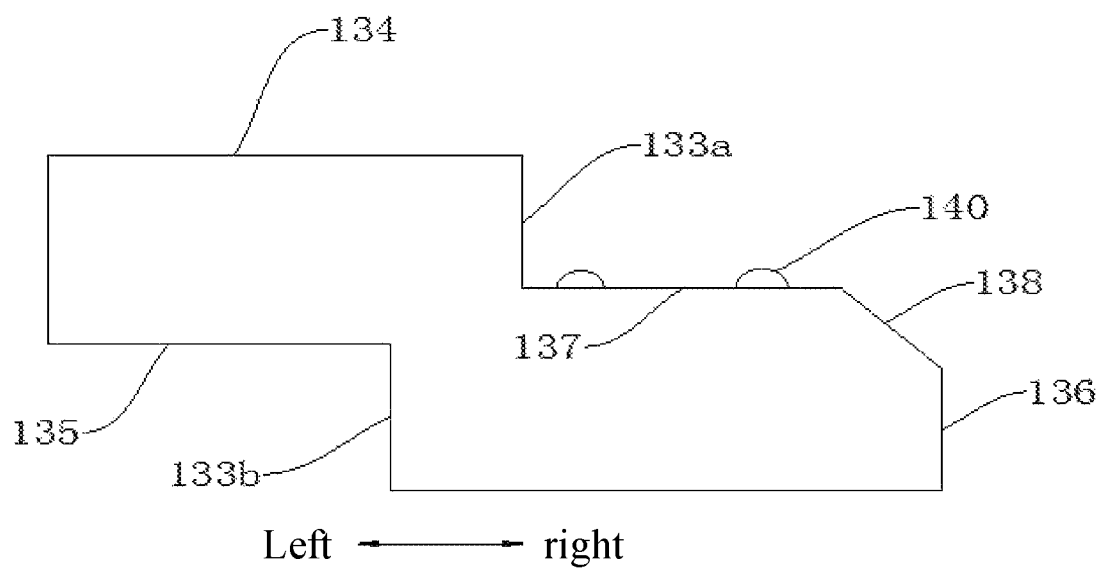
FIG. 7 is a structure diagram illustrating a power pin of a power interface according to an embodiment of the present disclosure.
Figure 8:
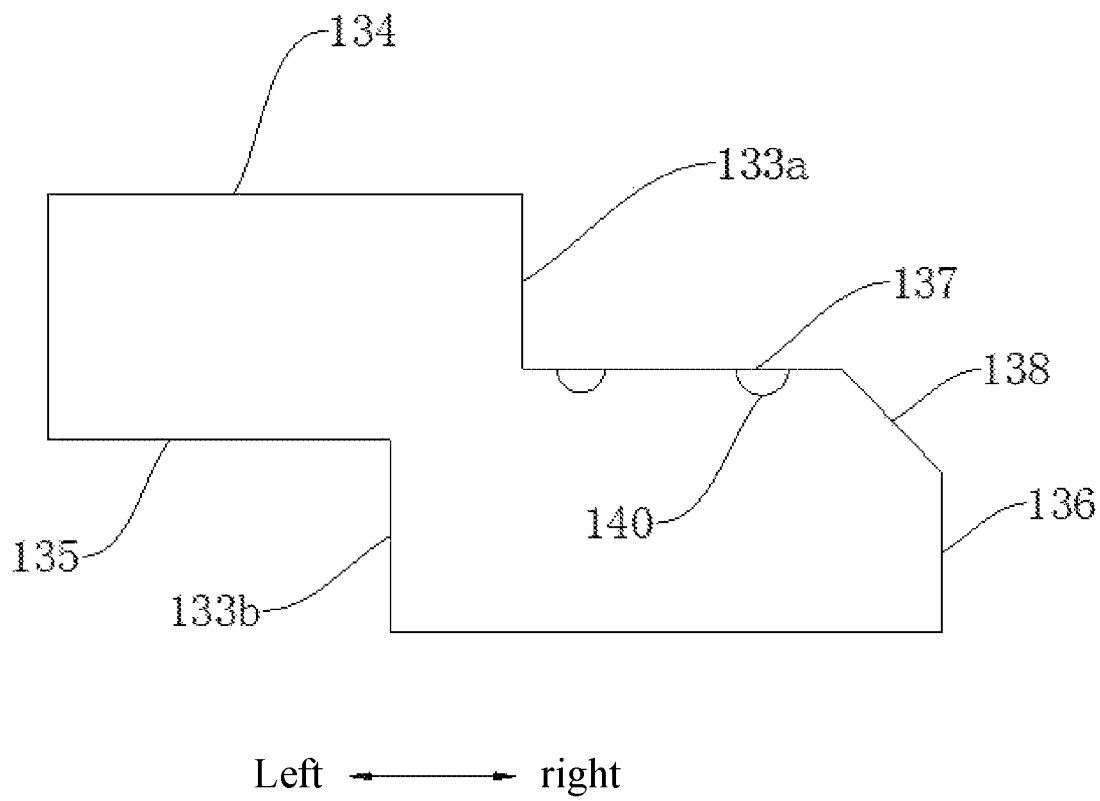
FIG. 8 is a structure diagram illustrating a power pin of a power interface according to an embodiment of the present disclosure.

As illustrated in FIG. 7 and FIG. 8, for improving attaching ability of the insulating spacer layer 139 in the sunken portion, a rough portion 140 may be arranged on an inner wall surface of the sunken portion. In such a manner, a contact area of the insulating spacer layer 139 and the sunken portion may be enlarged, thereby stably attaching the insulating spacer layer 139 to the interior of the sunken portion. In some examples of the present disclosure, as illustrated in FIG. 7, the rough portion 140 may be formed into a protrusion. The protrusion in the sunken portion may be embedded into the insulating spacer layer 139, thereby firmly attaching the insulating spacer layer 139 to the interior of the sunken portion. In some other embodiments of the present disclosure, as illustrated in FIG. 8, the rough portion 140 may be formed into a groove, and the groove may be filled with the insulating spacer layer 139. In some embodiments of the present disclosure, the rough portion 140 may also be formed into a rough surface.

According to some embodiments of the present disclosure, the sunken portion penetrates through a sidewall of at least one side of the widened section 132. On one hand, the power interface 100 may be applied to power adapters of different types. On the other hand, machining is facilitated and thus a machining process may be simplified. Furthermore, the sidewall, through which the sunken portion penetrates, of the widened section 132 is a first wall surface 136; a wall surface, which penetrates through the widened section 132, of the sunken portion is a second wall surface 137, and a chamfer 138 is formed at a position where the first wall surface 136 is intersected with the second wall surface 137. It is to be noted that formation of the chamfer 138 may not only enlarge the contact area of the sunken portion and the insulating spacer layer 139 and improve the attaching ability of the insulating spacer layer 139 in the sunken portion but also ensure a smooth transition of an outer surface of the power pin 130. In addition, when a stamping process is required for machining of the power pin 130, the part with the chamfer 138 may also be arranged to accommodate leftovers produced in a stamping process, so that smoothness of the outer surface of the power pin 130 may be improved.

Figure 10:
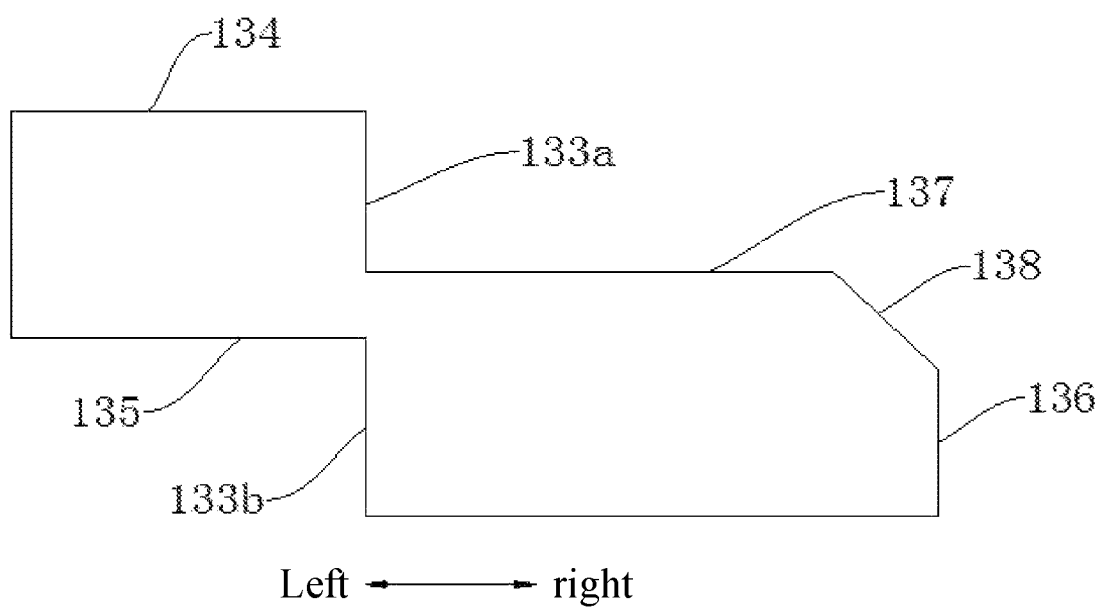
FIG. 10 is a structure diagram illustrating a power pin of a power interface according to an embodiment of the present disclosure.

According to some embodiments of the present disclosure, as illustrated in FIG. 10, there may be one stepped surface 133, the one stepped surface 133 is positioned on a first sidewall 134 of the widened section 132, and the first sidewall 134 is suitable for electrical connection with a conductive member. It is to be noted that, when the power interface 100 is electrically connected with the power adapter, the corresponding pin in/of the power adapter is electrically connected with the first sidewall 134 of the power pin 130 as the conductive member. It can be understood that, when the power interface 100 is electrically connected with the power adapter, the corresponding pin in the power adapter is closely attached to the first sidewall 134 of the power pin 130, thereby implementing a stable electrical connection between the power interface 100 and the power adapter.

In some examples of the present disclosure, a part, positioned on one side of the stepped surface 133, of the first sidewall 134 is a contact surface suitable for contacting with a conductive member; and the insulating spacer layer 139 is laid at a part, positioned on the other side of the stepped surface 133, of the first sidewall 134.

It is to be noted that the stepped surface 133 may be machined by a stamping method. For example, in the example illustrated in FIG. 10, the first sidewall 134 may be stamped in a direction illustrated by arrowhead a; the part, positioned on a left side of the stepped surface 133, on the first sidewall 134 is structured into the contact surface suitable for electrical connection with the conductive member; and the insulating spacer layer is laid at the part, positioned on a right side of the stepped surface 133, on the first sidewall 134.

Figure 6:
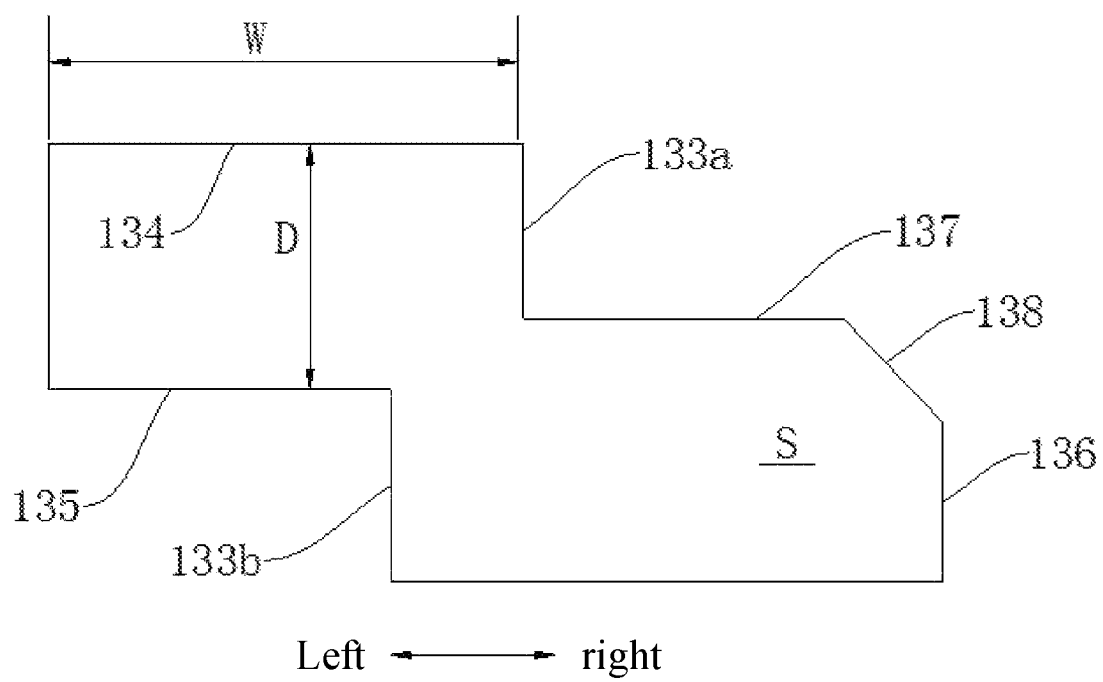
FIG. 6 is a structure diagram illustrating a power pin of a power interface according to an embodiment of the present disclosure.

According to an embodiment of the present disclosure, as illustrated in FIG. 6 and FIG. 10, a width of the contact surface in a width direction (a left-right direction illustrated in FIG. 6 and FIG. 10) of the power pint 130 is recorded as W, and W is greater than or equal to 0.24 mm and is less than or equal to 0.32 mm, i.e., 0.24 mm≤W≤0.32 mm. Experiments show that, when 0.24 mm≤W≤0.32 mm, the current load capacity of the power pin 130 is at least 10 A, and thus the current load capacity of the power pin 130 may be increased to improve the charging efficiency. Further tests show that, when W is equal to 0.25 mm, i.e., W=0.25 mm, the current load capacity of the power pin 130 may be greatly increased, the current load capacity of the power pin 130 is 12 A or more, and thus the charging efficiency may be improved.

According to some other embodiments of the present disclosure, as illustrated in FIG. 6-FIG. 9, two opposite sidewalls of the widened section 132 are the first sidewall 134 and a second sidewall 135, and the first sidewall 134 is suitable for electrical connection with the conductive member.

As illustrated in FIG. 6-FIG. 9, the stepped surface 133 includes two stepped surfaces: a first stepped surface 133a and a second stepped surface 133b. The first stepped surface 133a is positioned on the first sidewall 134, the second stepped surface 133b is positioned on the second sidewall 135, and the two stepped surfaces 133 are distributed at an interval in the width direction of the widened section 132. For example, as illustrated in FIG. 4-FIG. 9, the width direction of the widened section 132 may be the left-right direction illustrated in FIG. 4-FIG. 9, the first sidewall 134 faces an outer side (an outward direction illustrated in FIG. 4) of the power interface 100, and the second sidewall 135 faces an inner side (an inward direction illustrated in FIG. 4) of the power interface 100. The two stepped surfaces 133 are distributed in the left-right direction at the interval, the first stepped surface 133a is positioned on the first sidewall 134, and the second stepped surface 133b is positioned on the second sidewall 135.

Figure 9:
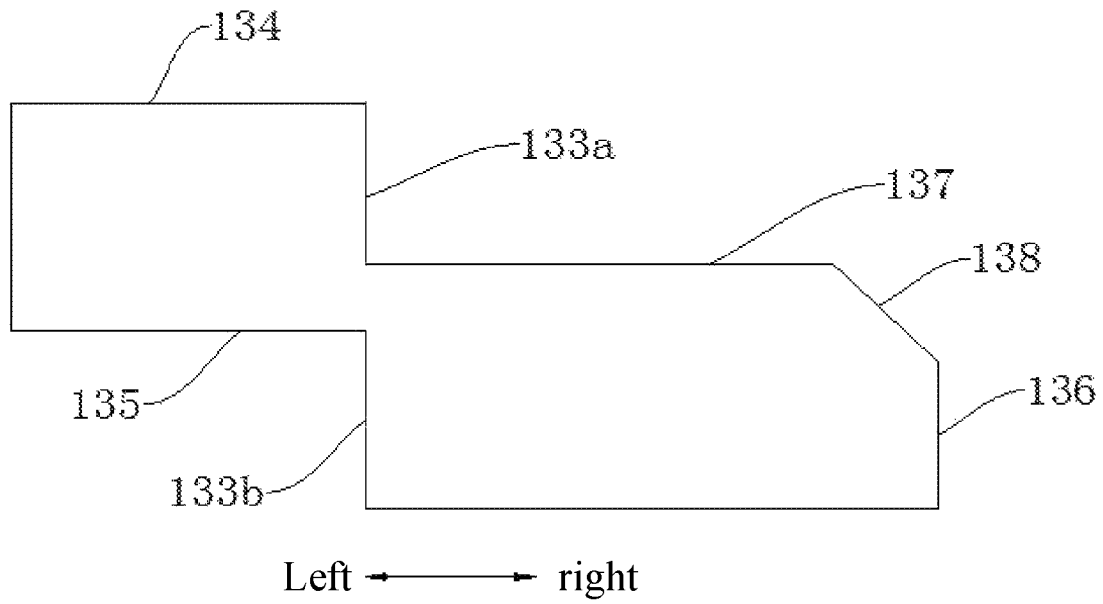
FIG. 9 is a structure diagram illustrating a power pin of a power interface according to an embodiment of the present disclosure.

It is to be noted that, when the power pin 130 is machined, the two stepped surfaces 133 may be machined through a stamping process. For example, the first sidewall 134 of the widened section 132 is stamped to form the first stepped surface 133a at first, and then the second sidewall 135 of the widened section 132 is stamped to form the second stepped surface 133b. For another example, a shape of a stationary die may be regulated in a stamping process to form the two stepped surfaces 133 by stamping at one time. According to an embodiment of the present disclosure, the first stepped surface 133a and the second stepped surface 133b are positioned in the same plane. For example, as illustrated in FIG. 9, the first stepped surface 133a and the second stepped surface 133b are positioned in the same vertical plane (a plane vertical to the left-right direction in FIG. 9).

The power interface 100 according to the embodiments of the present disclosure will be described below with reference to FIG. 1-FIG. 10 in detail. It is to be understood that the following descriptions are not specific limits to the present disclosure but only exemplary descriptions.

For convenient description, the power interface 100 is, for example, of a Type-C. A Type-C interface is an abbreviation of a Universal Serial Bus (USB) Type-C interface. It is an interface form and is a totally new data, video, audio, electrical energy transmission interface specification drafted by the USB standardization organization to overcome the longstanding shortcomings of USB interfaces that physical interface specifications are not unified, electrical energy may be unidirectionally transmitted only and the like.

A characteristic of the Type-C is that a standard device may claim its intention for occupying a VBUS (i.e., a positive connecting line of a conventional USB) to another connected party through a CC pin in an interface specification, the party with a relatively strong intention finally outputs a voltage and a current to the VBUS and the other party accepts power supplied by the VBUS or still refuses the supplied power but without influence on a transmission function. For more conveniently using this bus definition, a Type-C interface chip (for example, LDR6013) usually divides devices into four roles: a Downstream Facing Port (DFP), a strong Dual Role Port (DRP), a DRP and an Upstream Facing Port (UFP). Intentions of the four roles for occupying the VBUS are progressively weakened in sequence.

Herein, the DFP is equivalent to an adapter and may keep intended to output a voltage to the VBUS. The strong DRP is equivalent to a mobile power supply and may stop output to the VBUS only when there is an adapter. The DRP is equivalent to a mobile terminal, expects to be powered by an opposite party under a normal condition and, when there is a device weaker than itself, reluctantly outputs a voltage to the opposite party. The UFP never externally outputs electrical energy and is usually a weak-battery device or battery-free device, for example, a Bluetooth headset. The USB Type-C supports normal and reverse plugging. Since there are totally four groups of power supplies and Ground (GND) pins on front and reverse surfaces, supported power may be greatly improved.

The power interface 100 in the embodiments may be a USB Type-C interface, may be applied to a power adapter with a quick charging function and is also applied to an ordinary power adapter. It is to be noted herein that quick charging may refer to a charging state in which a charging current is higher than 2.5 A or a charging state in which rated output power is not lower than 15 W, and normal charging may refer to a charging state in which the charging current is less than or equal to 2.5 A or a charging state in which the rated output power is lower than 15 W. That is, when the power adapter with the quick charging function is adopted to charge the power interface 100, the charging current is more than or equal to 2.5 A or rated output power is not lower than 15 W; when the ordinary power adapter is adopted to charge the power interface 100, the charging current is lower than 2.5 A or the rated output power is lower than 15 W.

For standardizing the power interface 100 and the power adapter adapted to the power interface 100, a size of the power interface 100 meets a design requirement of a standard interface. For example, a width (a width in a left-right direction of the power interface 100, the left-right direction illustrated in FIG. 1) consistent with a design requirement of a power interface 100 with 24 pins is a. For making the power interface 100 in the embodiments meet a design standard, a width (a width in the left-right direction of the power interface 100, the left-right direction illustrated in FIG. 1) of the power interface 100 in the embodiments is also a. For enabling power pins 130 to bear relatively high charging currents in a limited space, part of pins in the 24 pins may be removed and, meanwhile, cross-sectional areas of the power pins 130 are enlarged to bear the relatively high charging currents. Enlarged parts of the power pins 130 may be arranged at positions of the removed pins. On one hand, an optimal layout of parts of the power interface 100 is implemented and, on the other hand, a current bearing capability of the power pins 130 is improved.

Figure 3:
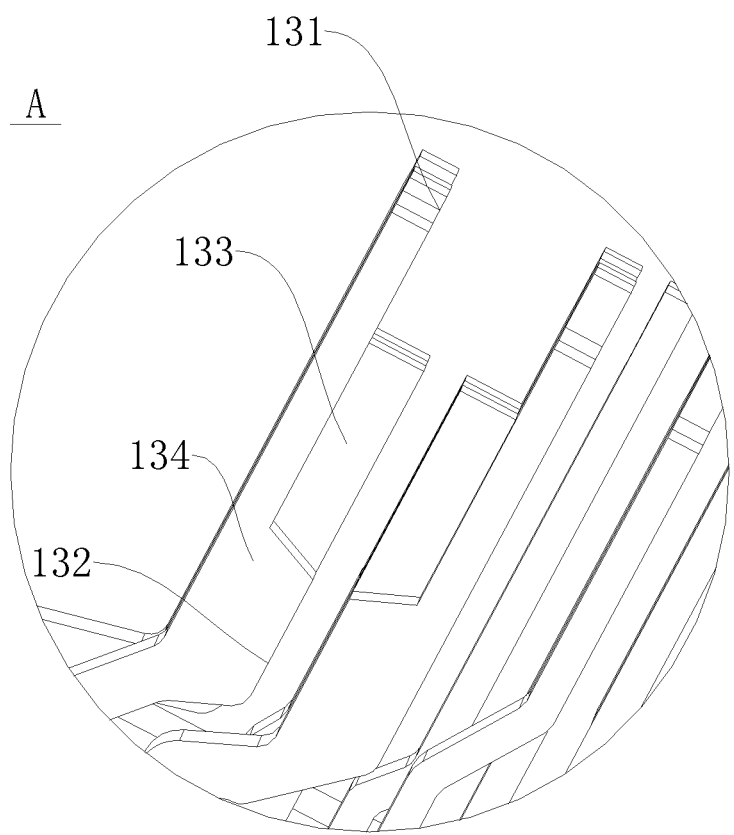
FIG. 3 is a partial enlarged diagram of part A in FIG. 2.

Specifically, as illustrated in FIG. 1-FIG. 3, the power interface 130 includes a body portion 110, six data pins 120 and eight power pins 130. The six data pins 120 are A5, A6, A7, B5, B6 and B7 respectively; the eight power pins 130 are A1, A4, A9, A12, B1, B4, B9 and B12 respectively; four of the eight power pins 130 are four VBUS pins and the other four are GND pins. A middle patch 150 is sandwiched by two opposite GND pins. It is to be noted that the power interface 100 may be formed in a mobile terminal, a battery may be arranged in the mobile terminal (for example, a mobile phone, a tablet computer and a notebook computer), and an external power supply may be connected with the power interface 100 through a power adapter to further charge the battery.

The body portion 110 is configured to be coupled to a circuit board, and there are multiple spaced data pins 120 connected with the body portion 110. There may be multiple spaced power pins 130 connected with the body portion 110. The power pins 130 and the data pins 120 are arranged at intervals. At least one of the multiple power pins 130 includes a widened section 132, the widened section 132 is positioned in middle of the power pin 130, and a cross-sectional area of the widened section 132 is larger than a cross-sectional area of each of the data pins 120 to increase a current load capacity of the power pin 130. The widened section 132 may occupy a position of a removed pin, which, on one hand, may increase a charging current bearable for the power pin 130 to easily realize the quick charging function and, on the other hand, may increase a space utilization rate of the power interface 100.

As illustrated in FIG. 6 and FIG. 10, a thickness of the power pin 130 is recorded as D, and the cross-sectional area of the widened section 132 is recorded as S. Experiments show that, when D=0.25 mm and S=0.13125 mm$^2$, the current load capacity of the power pin 130 is at least 12 A, and thus charging efficiency may be improved. Furthermore, as illustrated in FIG. 10, when W=0.25 mm, the current load capacity of the power pin 130 may be 14 A or more, and thus the charging efficiency may be improved.

As illustrated in FIG. 6 and FIG. 10, the power pin 130 is provided with a contact surface suitable for electrical connection with a power adapter, a width of the contact surface in a width direction (a left-right direction illustrated in FIG. 6 and FIG. 10) of the power pin 130 is recorded as W, and W meets 0.24 mm≤W≤0.32 mm. Experiments show that, when 0.24 mm≤W≤0.32 mm, the current load capacity of the power pin 130 is at least 10 A, and thus the current load capacity of the power pin 130 may be increased to improve the charging efficiency. Further tests show that, when W=0.25 mm, the current load capacity of the power pin 130 may be greatly increased, the current load capacity of the power pin 130 may be 10 A, 12 A, 14 A or more, and thus the charging efficiency may be improved.

As illustrated in FIG. 4-FIG. 8, part of an outer surface of the power pin 130 and an outer surface of the data pin 120 are wrapped with a rubber coating portion, and the rubber coating portion is made from a thermal conductive insulating material. A stepped surface 133 is formed at a position, close to a front end 131 of the power pin 130, of the widened section 132, and the stepped surface 133 may be filled with the rubber coating portion. A rough surface may be arranged on an inner wall surface of the stepped surface 133, and then a contact area of the rubber coating portion and the stepped surface 133 may be enlarged, so that the rubber coating portion may be stably attached to the interior of the stepped surface 133.

It is to be noted that, during quick charging of the power interface 100, the power pin 130 with the widened section 132 may be configured to bear a relatively high charging current. During normal charging of the power interface 100, the rubber coating portion filled in the stepped surface 133 may avoid the power pin 130 contacting with a corresponding pin on the power adapter. Therefore, the power interface 100 in the embodiments may be applied to different power adapters.

Figure 4:
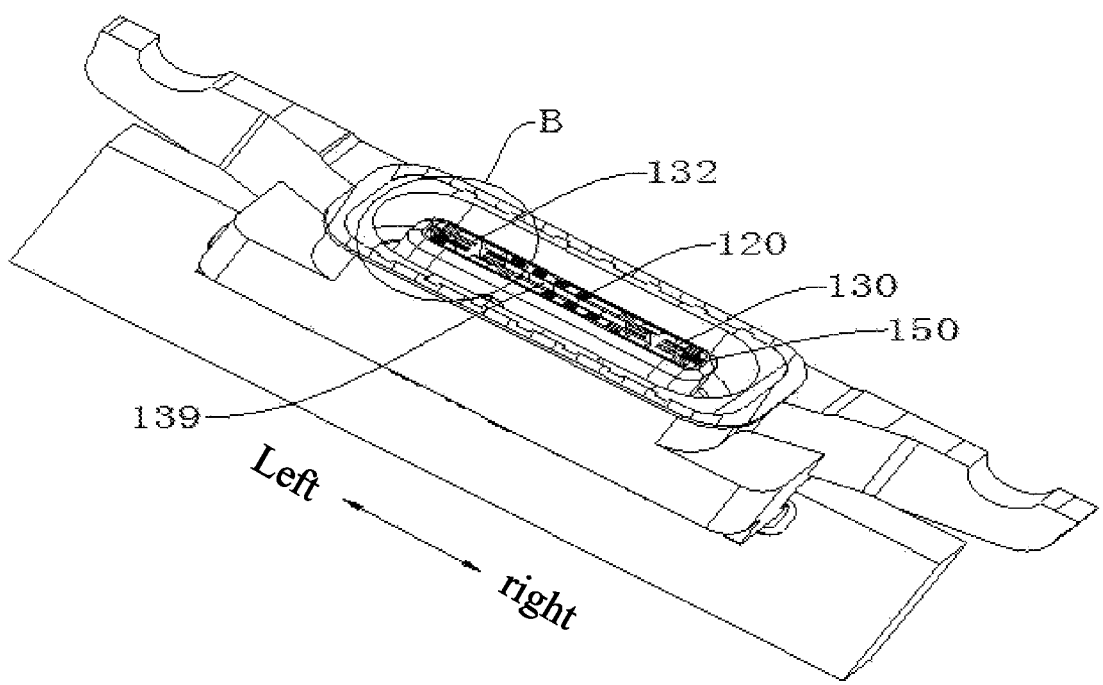
FIG. 4 is a sectional view illustrating a power interface according to an embodiment of the present disclosure.
Figure 5:
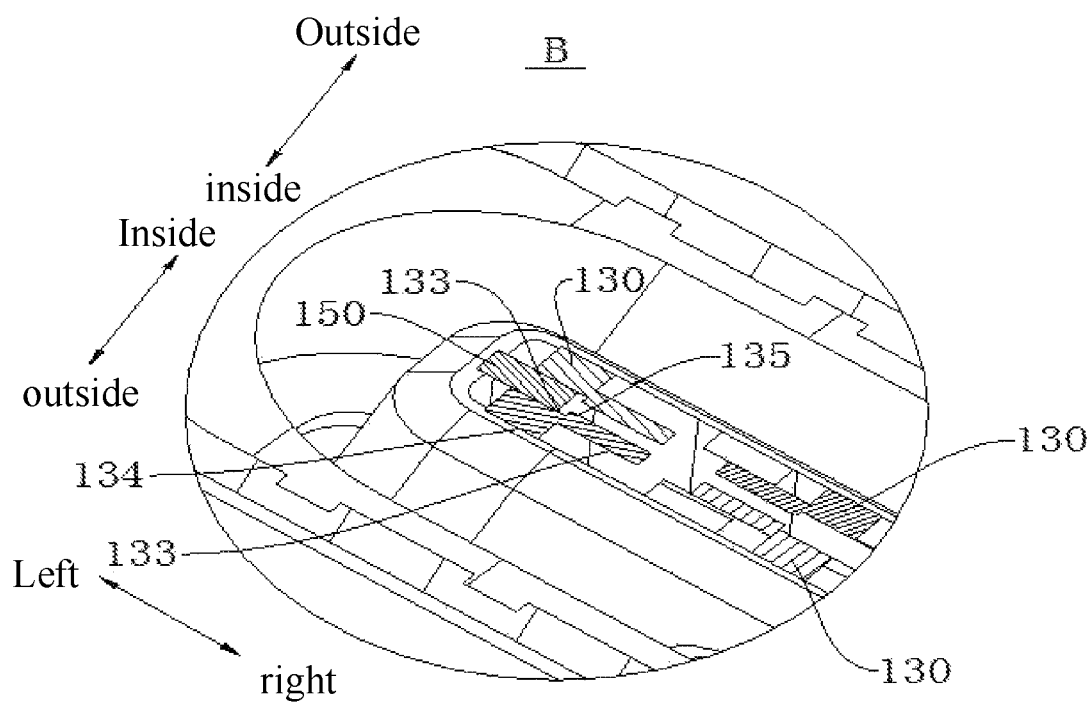
FIG. 5 is a partial enlarged diagram of part B in FIG. 4.

As illustrated in FIG. 6, there may be two stepped surfaces 133 and the two stepped surfaces 133 are distributed at an interval in the left-right direction (the left-right direction illustrated in FIG. 4-FIG. 8). As illustrated in FIG. 4 and FIG. 5, a second sidewall 135 is opposite to a first sidewall 134, the first sidewall 134 is suitable for electrical connection with a conductive member and faces an outer side (an outward direction illustrated in FIG. 4) of the power interface 100, the second sidewall 135 is opposite to the first sidewall 134 and faces an inner side (an inward direction illustrated in FIG. 4) of the power interface 100, one stepped surface 133 is positioned on the first sidewall 134, and the other stepped surface 133 is positioned on the second sidewall 135.

As illustrated in FIG. 6, the stepped surface 133 penetrates through a sidewall of at least one side of the widened section 132. On one hand, the power interface 100 may be applied to power adapters of different types. On the other hand, machining is facilitated and thus a machining process may be simplified. Furthermore, the sidewall, through which the stepped surface 133 penetrates, of the widened section 132 is a first wall surface 136; a wall surface, which penetrates through the widened section 132, of the stepped surface 133 is a second wall surface 137, and a chamfer 138 is formed at a position where the first wall surface 136 is intersected with the second wall surface 137. It is to be noted that formation of the chamfer 138 may not only enlarge the contact area of the stepped surface 133 and the insulating spacer layer 139 and improve the attaching ability of the insulating spacer layer 139 in the stepped surface 133 but also ensure a smooth transition of an outer surface of the power pin 130. In addition, when a stamping process is required for machining of the power pin 130, the part with the chamfer 138 may also be arranged to accommodate leftovers produced in a stamping process, so that smoothness of the outer surface of the power pin 130 may be improved.

In such a manner, the widened portion 132 is arranged on the power pin 130, and then the current load capacity of the power pin 130 may be increased, so that a current transmission speed may be increased, the power interface 100 is endowed with the quick charging function, and the charging efficiency of the battery is improved.

A mobile terminal according to the embodiments of the present disclosure includes the abovementioned power interface 100. The mobile terminal may implement transmission of an electrical signal and a data signal through the power interface 100. For example, the mobile terminal may be electrically connected with a power adapter through the power interface 100 to realize a charging or data transmission function.

According to the mobile terminal of the embodiments of the present disclosure, a widened portion 132 is arranged on the power pin 130, and then a current load capacity of the power pill 130 may be increased, so that a current transmission speed may be increased, the power interface 100 is endowed with a quick charging function, and charging efficiency of a battery is improved.

A power adapter according to the embodiments of the present disclosure is provided with the abovementioned power interface 100. A mobile terminal may implement transmission of an electrical signal and a data signal through the power interface 100.

According to the power adapter of the embodiments of the present disclosure, a widened portion 132 is arranged on a power pin 130, and then a current load capacity of the power pin 130 may be increased, so that a current transmission speed may be increased, the power interface 100 is endowed with a quick charging function, and charging efficiency of a battery is improved.

In the descriptions of the specification, the descriptions made with reference to terms "an embodiment", "some embodiments", "example", "specific example", "some examples" or the like refer to that specific features, structures, materials or characteristics described in combination with the embodiment or the example are included in at least one embodiment or example of the present disclosure. In the specification, these terms are not always schematically expressed for the same embodiment or example. Moreover, the specific described features, structures, materials or characteristics may be combined in a proper manner in any one or more embodiments or examples. In addition, those skilled in the art may integrate and combine different embodiments or examples described in the specification and features of different embodiments or examples without conflicts.

The embodiments of the present disclosure have been shown or described above. However, it can be understood that the abovementioned embodiments are exemplary and should not be understood as limits to the present disclosure and those of ordinary skill in the art may make variations, modifications, replacements, transformations to the abovementioned embodiments within the scope of the present disclosure.

The invention claimed is:

1. A power interface, comprising:
a body portion configured to be coupled to a circuit board;
multiple spaced data pins, wherein the data pins are connected with the body portion; and
multiple spaced power pins, wherein the power pins are connected with the body portion, the power pins are spaced from the data pins, at least one of the power pins includes a widened section, and a cross-sectional area of the widened section is greater than a cross-sectional area of each of the data pins to increase a current load capacity of the power pin.

2. The power interface of claim 1, wherein the cross-sectional area of the widened section is recorded as S, wherein S is greater than or equal to 0.09805 mm$^2$.

3. The power interface of claim 2, wherein S is equal to 0.13125 mm$^2$.

4. The power interface of claim 1, wherein the power pin has a thickness D, wherein D is greater than or equal to 0.1 mm and is less than or equal to 0.3 mm.

5. The power interface of claim 4, wherein D is equal to 0.25 mm.

6. The power interface of claim 1, wherein a stepped surface is arranged at the widened section close to a front end of the power pin.

7. The power interface of claim 6, wherein there is one stepped surface which is positioned on a first sidewall of the widened section, and the first sidewall is suitable for electrical connection with a conductive member.

8. The power interface of claim 7, wherein a part, positioned on one side of the stepped surface, of the first sidewall is a contact surface suitable for contacting with the conductive member, and an insulating spacer layer is laid at a part, positioned on the other side of the stepped surface, of the first sidewall.

9. The power interface of claim 8, wherein the contact surface in a width direction of the power pin has a width W, wherein W is greater than or equal to 0.24 mm and is less than or equal to 0.32 mm.

10. The power interface of claim 9, wherein W is equal to 0.25 mm.

11. The power interface of claim 6, wherein two opposite sidewalls of the widened section are a first sidewall and a second sidewall, and the first sidewall is suitable for electrical connection with the conductive member;
wherein there are two stepped surfaces which are a first stepped surface and a second stepped surface respectively, the first stepped surface is positioned on the first sidewall, the second stepped surface is positioned on the second sidewall, and the two stepped surfaces are distributed at an interval in a width direction of the widened section.

12. The power interface of claim 11, wherein the first stepped surface and the second stepped surface are positioned in a same plane.

13. The power interface of claim 1, wherein the widened section is positioned in middle of the power pin.

14. The power interface of claim 1, wherein some of the power pins are VBUS pins, and other of the power pins are Ground (GND) pins.

15. A mobile terminal comprising a power interface, a circuit board and a battery wherein the power interface comprises:
a body portion configured to the circuit board;
multiple spaced power pins are connected with the body portion; and
multiple spaced power pins, wherein the power pins are connected with the body portion, the power pins are spaced from the data pins, at least one of the power pins includes a widened section, and a cross-sectional area of the widened section is greater than a cross-sectional area of each of the data pins to increase a current load capacity of the power pin; and a stepped surface is arranged at the widened section close to a front end of the power pin;
wherein the power pin with the widened section is applied for the power interface to charge the battery under a first charging mode, and the stepped surface on the widened section is applied for the power interface to charge the battery under a second charging mode, wherein the first charging mode has a rated output power or charging current larger than that of the second charging mode.

16. A power adapter, comprising a power interface and a circuit board, wherein the power interface comprises;
a body portion configured to be coupled to the circuit board;
multiple spaced data pins, wherein the data pins are connected with the body portion; and
multiple spaced power pins, wherein the power pins are connected with the body portion, the power pins are spaced from the data pins, at least one of the power pins includes a widened section, and a cross-sectional area of the widened section is greater than a cross-sectional area of each of the data pins to increase a current load capacity of the power pin; and a stepped surface is arranged at the widened section close to a front end of the power pin;
wherein the power pin with the widened section is applied for the power interface to charge a battery under a first charging mode, and the stepped surface on the widened section is applied for the power interface to charge the battery under a second charging mode, wherein the first charging mode has a rated output power or charging current larger than that of the second charging mode.

17. The power interface of claim 6, wherein a side of the stepped surface is formed into a sunken portion, and the sunken portion is filled with an insulating spacer layer.

18. The power interface of claim 17, wherein a rough portion is arranged on an inner wall surface of the sunken portion;
wherein the rough portion is a protrusion, and the protrusion is embedded into the insulating spacer layer.

19. The power interface of claim 17, wherein a rough portion is arranged on an inner wall surface of the sunken portion;
wherein the rough portion is a groove, and the groove is filled with the insulating spacer layer.

20. The power interface of claim 17, wherein a sidewall of the widened section through which the sunken portion penetrates is a first wall surface, and a wall surface of the sunken portion which penetrates through the widened section is a second wall surface, and a chamfer is formed at a position where the first wall surface is intersected with the second wall surface.

* * * * *